US005592870A

United States Patent [19]

Sanchez et al.

[11] Patent Number: 5,592,870
[45] Date of Patent: Jan. 14, 1997

[54] MASA HANDLING APPARATUS AND METHOD FOR HANDLING MASA

[75] Inventors: Victor R. Sanchez, Fontana; Alberto Ceja, Pico Rivera; Rigoberto Anguiano, Baldwin Park, all of Calif.

[73] Assignee: Machine Masters, Inc., Pomona, Calif.

[21] Appl. No.: 192,458

[22] Filed: Feb. 7, 1994

[51] Int. Cl.⁶ .............................. A21C 15/00; A47J 37/00
[52] U.S. Cl. ............................................ 99/353; 99/443 C
[58] Field of Search ........................ 99/353, 352, 443 C; 198/604, 607, 626.1; 221/71, 74, 84

[56] References Cited

U.S. PATENT DOCUMENTS

| | | | |
|---|---|---|---|
| 3,693,533 | 9/1972 | Liepa | 99/443 C |
| 3,853,016 | 12/1974 | Lane, III et al. | 198/626.1 |
| 3,869,971 | 3/1975 | Driscoll | 99/353 |
| 4,304,326 | 12/1981 | Fowler | 198/604 |
| 4,334,845 | 6/1982 | Tamminen | 99/353 |
| 4,640,843 | 2/1987 | Matuszak et al. | 426/560 |
| 4,778,690 | 10/1988 | Sadel, Jr. et al. | 426/560 |
| 4,978,548 | 12/1990 | Cope et al. | 99/443 C |
| 4,985,269 | 1/1991 | Irvin et al. | 426/560 |
| 5,050,727 | 9/1991 | Akesaka | 198/626.1 |
| 5,200,203 | 4/1993 | Hayashi | 198/604 |
| 5,272,962 | 12/1993 | Kageyama et al. | 99/353 |

Primary Examiner—David Scherbel
Assistant Examiner—Reginald L. Alexander
Attorney, Agent, or Firm—Pretty, Schroeder, Brueggemann & Clark

[57] ABSTRACT

A masa handling apparatus for the continuous processing of masa type dough in conjunction with commonly available feed processing equipment, such as a masa extruder, an oven, or cooling apparatus. The masa handling apparatus includes a masa separator having a pair of opposed, endless belt conveyors having facing surfaces spaced apart to receive a generally continuous masa steam output from a nozzle on the masa extruder. When the masa stream moves between the conveyors, it is gripped by their facing surfaces and moved away from the nozzle at a faster speed, causing the masa to be separated into individual pieces, or logs. The masa handling apparatus can also include at least two masa hoppers fed by at least two endless belt conveyors arranged in upstream and downstream positions relative to each other. The masa is transported along the conveyors and is automatically diverted into one masa hopper by a diverter gate. The diverter gate is operated by a controller that receives a signal from a sensor sensing a masa level within an associated hopper. The masa handling apparatus can also include a self-feeding masa hopper that has an opening for receiving masa from its associated feed conveyor. The hopper has one or more rotating shafts having projections to remove gas bubbles from the masa and force it toward a pair of sheeter rollers.

31 Claims, 4 Drawing Sheets

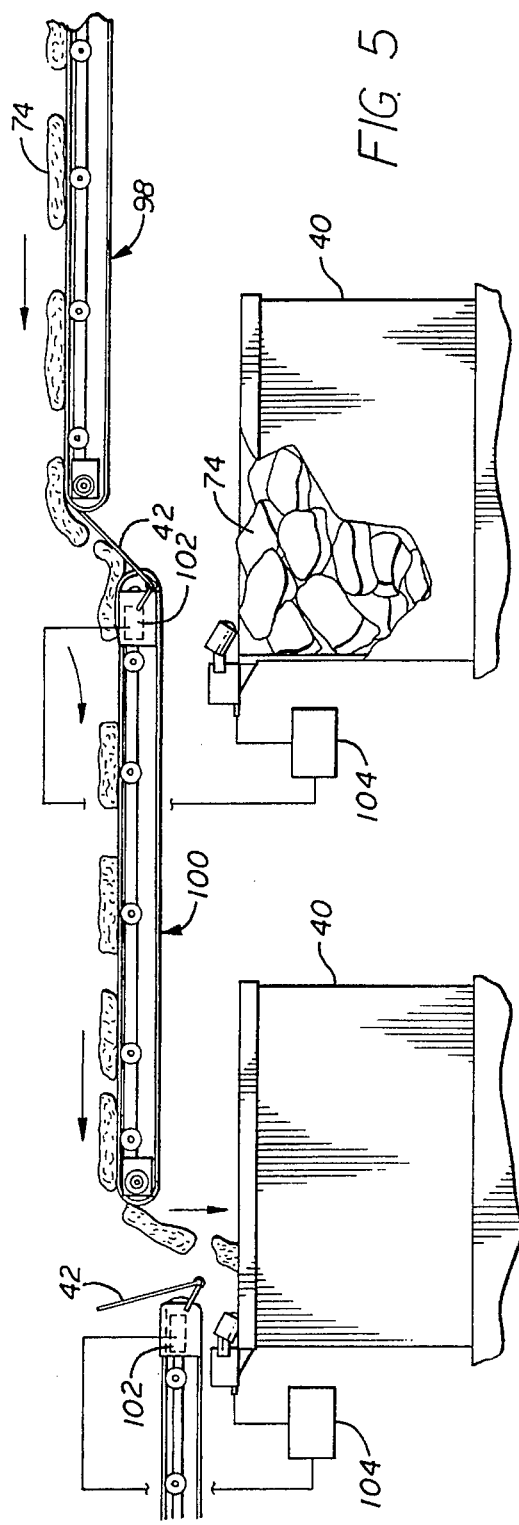
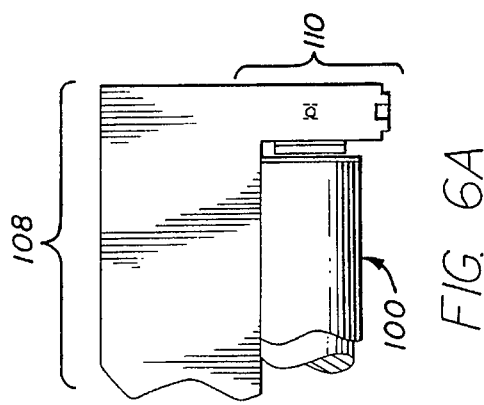
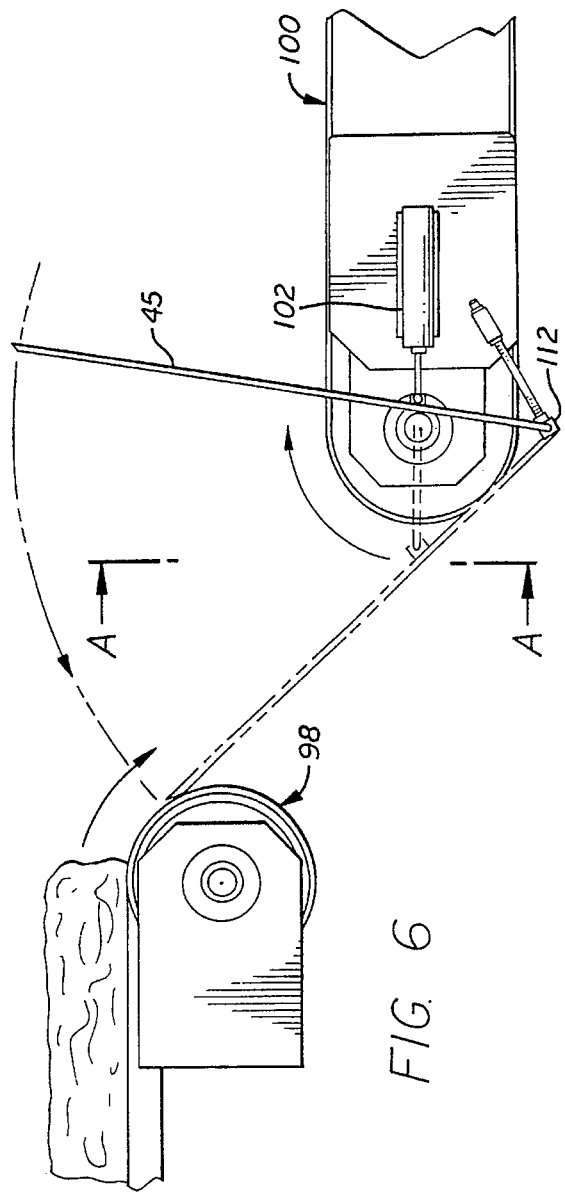
FIG. 5
FIG. 6A
FIG. 6

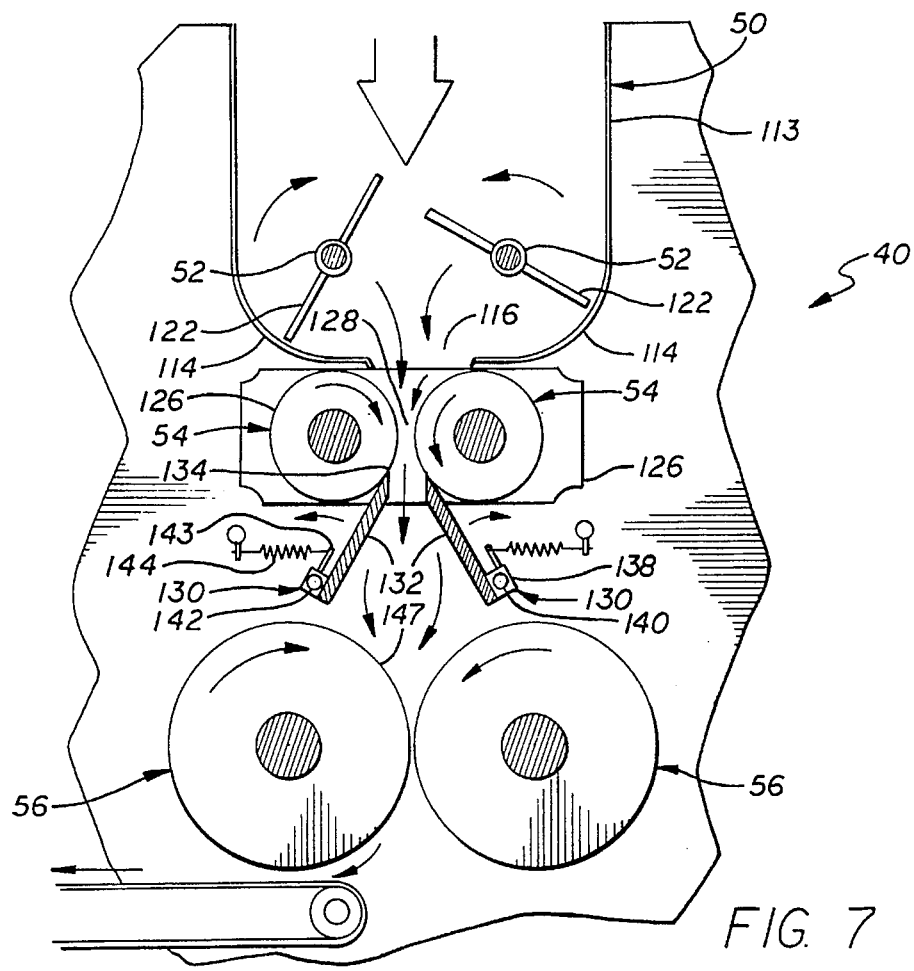
FIG. 7
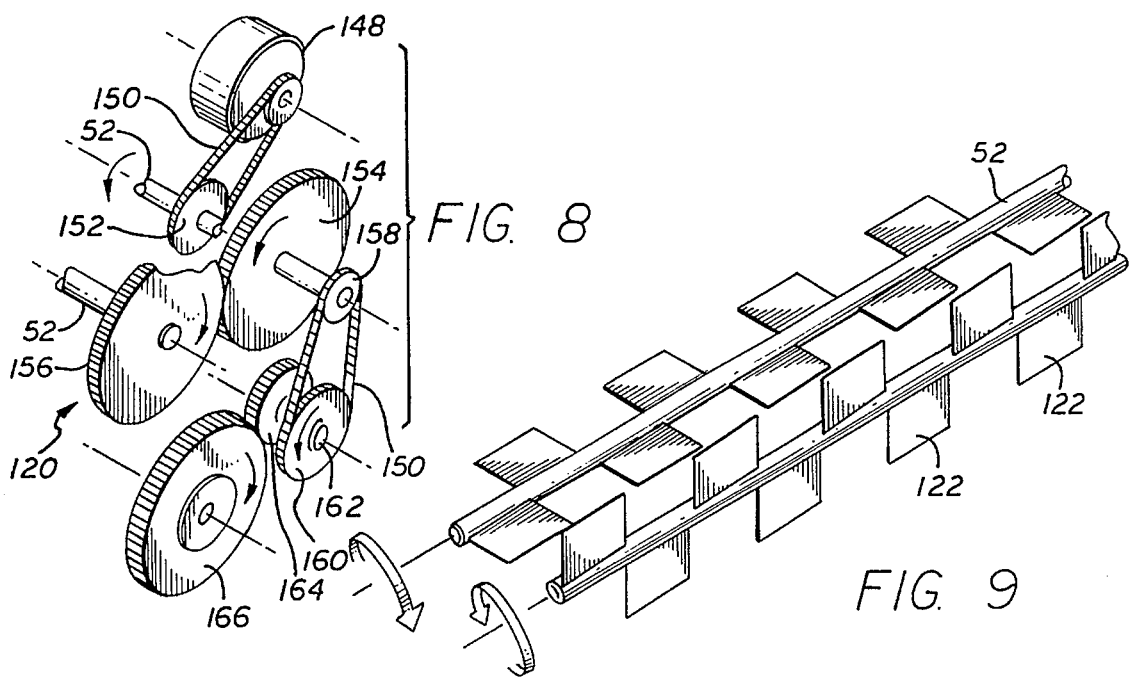
FIG. 8
FIG. 9

MASA HANDLING APPARATUS AND METHOD FOR HANDLING MASA

FIELD OF THE INVENTION

The present invention relates to an apparatus and method for the commercial manufacture of food or edible material, and, more particularly, to the treatment or preparation of farinaceous dough, batter, or pastry products including sheeting, laminating, or folding.

BACKGROUND OF THE INVENTION

A tortilla is a baked grain product which originated in Mexico and is now widely consumed throughout the world. The word tortilla as used herein refers to such a baked grain product having a variety of shapes, including a circular shape, formed from a relatively flat dough. While the present invention concerns the production of tortillas, the invention also may also successfully used in the production of food products having other shapes.

As the demand for tortillas has grown, the methods and the apparatus for automatically producing tortillas in high volumes has become well known. In the conventional automated system, a dough is produced by cooking whole corn and grinding it wet or by combining instant corn masa flour with water in a commonly available mixer. This dough is generally referred to as "masa". However, the term "masa" as used herein refers to this corn dough and other doughs having similar characteristics. The masa is often fed into an extruder which compresses the masa and outputs it in the form of a generally continuous stream to a pneumatic cutter. The pneumatic cutter chops the masa into generally cylindrical pieces, generally known as "logs". The logs are usually carried on a conveyor to a masa hopper, which gravity feeds the masa to several successive pairs of generally opposed, cylindrical rollers for compression into a sheet having the thickness required for tortilla production. The final pair of opposed rollers are generally known as "sheeter" rollers because they produce a thin sheet of masa. This "sheeted" masa is then cut into the desired tortilla shape by a commonly available rotary cutter, which usually cuts circles of varying diameter. The cut masa is then baked, cooled, and packaged by commonly available commercial food processing equipment.

A portion of an automatic masa processing system is shown in the U.S. Pat. No. 3,869,971 to Driscoll. The masa processing system described by Driscoll has an endless belt conveyor for feeding masa to a masa hopper. The masa within the masa hopper is then gravity fed into a pair of opposed, counter-rotating primary rollers which compress the masa into a wide curtain of an intermediate thickness. The curtain then moves along a conveyor to a set of sheeter rollers for a final compression into the sheet having a thickness suitable to form the desired tortillas. The sheeted masa is then moved, via conveyor, through a rotating cutter which stamps circular shapes in the masa sheet. Although the rest of the Driscoll apparatus is designed to manufacture food chips from the cut masa, the remainder of the process of baking and cooling tortillas, which only generally concerns this invention, is well known and is schematically shown in the U.S. Pat. No. 4,978,548 to Cope et al. Also by way of reference, another U.S. Pat. No. 4,640,843 to Matuszak et al., describes a masa extruder and a masa hopper feeding two primary rollers and one associated sheeter roller.

The inventors of the present invention have no reason not to believe that the masa processing system previously described is not generally effective and safe. However, under certain conditions, there may be some drawbacks associated with masa processing systems generally designed according to the prior art. One such drawback can be the danger associated with the pneumatic cutter. The pneumatic cutter has a reciprocating blade which could injure an attending worker if that worker places his or her hands under the operating blade.

Another drawback can be associated with the conveyors intended to transport the masa logs from the pneumatic cutter to the masa hoppers. With increasing demand for tortillas, many companies now desire to operate several parallel production lines, each line having its own masa hopper and its own associated subsequent rolling, cutting, cooking, cooling, and packaging apparatus. Generally, because one masa mixer and extruder can output enough masa to adequately supply several production lines, it is desirable to have an automatic masa hopper feed system capable of maintaining an adequate supply of masa within each masa hopper. However, the conveyors designed according to the prior art simply move masa logs from the pneumatic cutter to one masa hopper. Thus, a masa handling system built according to the prior art could require several conveyors, each running independently from the pneumatic cutter to an associated masa hopper. Furthermore, human attendants could be required to monitor the level of masa in each masa hopper and guide the masa logs onto the conveyors which are running to near-empty masa hoppers. Such a system could have evident disadvantages due to the labor cost of the attendants and the awkwardness of the manual channeling of masa to each conveyor. Furthermore, if the system utilizes only one conveyor running past the masa hoppers in series, the unwanted labor expense is also necessary because human attendants could be required to maintain the masa levels by manually carrying the masa logs from the conveyor to a near-empty masa hopper.

Yet another drawback can be associated with the masa hoppers generally designed according to the prior art. Unwanted gas bubbles can become trapped in the masa and cause voids in the wide masa curtain output by the primary rollers. When this occurs, the voids persist as the masa continues through the sheeter rollers and the rotary cutter, causing imperfectly formed tortillas to be produced. To eliminate the voids, human attendants must manually compress the masa while it is in the masa hopper, resulting in undesirable increased costs.

One final drawback associated with the primary rollers designed according to the prior art can be the tendency of the masa curtain to adhere to the primary rollers after its initial compression. If the masa curtain exits from the primary rollers in a fashion whereby it is stuck to the surface of one of the rollers, the curtain can be carried around the primary roller and away from the sheeter rollers. As a result, the flow of masa to the sheeter rollers can be substantially disrupted.

It should, therefore, be appreciated that there still is a need for masa processing system that has the following features: the safe separation of the masa into individual logs; the automatic distribution of those logs to the masa hoppers requiring resupply; the automatic removal of gas bubbles from the masa within the masa hopper; and the prevention of the masa curtain from becoming stuck to the primary rollers. Accordingly, the present invention fulfills all of these needs.

SUMMARY OF THE INVENTION

The present invention provides a masa handling system that has the following features: the safe separation of the masa into the individual logs; the automatic distribution of those logs to the masa hoppers requiring resupply; the automatic removal of gas bubbles from the masa within the masa hoppers; and the prevention of the masa curtain from becoming stuck to the primary rollers. The masa handling system of the invention is for use in conjunction with commonly available food processing equipment, such as an oven and cooling apparatus for the commercial processing of masa. By way of example, the present inventors refer to masa, but intend to include other similar doughs within the meaning of the word "masa."

Such masa processing equipment generally has a masa producing device, typically a mixer and an adjacent extruder which produces a generally continuous stream of masa to the invention. The masa is processed according to the invention and is ultimately fed into a pair of opposed, aligned, counter-rotating sheeter rollers which compress the masa into a final thickness.

More particularly, the masa handling system has a masa separator having a pair of aligned, opposed endless belt separator conveyors. The separator conveyors have their facing surfaces spaced apart and generally parallel to define a masa chamber therebetween. The masa chamber has input and output ends. The masa separator also has a nozzle connected to the masa producing device for feeding masa into the input end of the masa chamber. When the masa enters the masa chamber, it is gripped by the facing surfaces and moved therebetween. The facing surfaces of the separator conveyors move in the same direction away from the nozzle and cause the masa to be separated into masa logs.

The masa handling system includes at least two masa hoppers and at least two endless belt feed conveyors which have upper surfaces that move in the same direction. The feed conveyors are arranged in relative upstream and downstream positions relative to each other. The upstream feed conveyor extends from the output end of the masa chamber defined by the opposed, aligned separator conveyors of the masa separator, to receive the masa logs. The upstream feed conveyor extends to a point generally above one of the masa hoppers. The downstream feed conveyor extends from a position spaced from the upstream conveyor to a point generally above another of the masa hoppers.

The masa handling system also has a diverter gate that is positioned between the feed conveyors. the diverter gate selectively moves between a first position and a second position. When the diverter gate is in the first position, the mesa logs are guided from the upstream feed conveyor to the downstream feed conveyor. When the diverter gate is in the second position, the masa logs are guided into the masa hopper.

The masa handling system also has a sensor associated with each masa hopper for the sensing of the level of masa therein. The sensor causes a signal which changes its state when the level of masa in the associated masa hopper is below a predetermined level. A mechanism is connected to each diverter gate and is responsive to the signal from the sensor. The mechanism moves the diverter gate from the first position to the second position when the level of masa is the one masa hopper is sensed to be below the predetermined level. The mechanism returns the diverter gate to the first position when the level of masa in the one masa hopper is sensed to be above a predetermined level.

The masa hoppers are self feeding and each has an opening positioned for receiving masa from its associated feed conveyor. Each masa hopper also has a gravity feeder with side walls and a bottom wall cooperating to define a space for the placement of the masa to be fed to the sheeter rollers. One or more rotating shafts are mounted within the gravity feeder. Each shaft has projections which remove gas bubbles from the masa and force the masa towards the sheeter rollers. The bottom wall of the gravity feeder extends from the side walls and defines a slot which the masa passes through, towards the sheeter rollers.

The foregoing structural arrangement of the invention provides several important advantages. Chief among them is the safe separation of the generally continuous masa stream into masa logs. As discussed above, the devices designed according to the prior art incorporate a pneumatic cutter that has a blade which can injure attending workers. Accordingly, it is desirable to separate the masa stream into masa logs without the pneumatic cutter and its associated danger. The present invention avoids this problem because it does not utilize a cutter with a blade. Therefore, the present invention offers a relatively safer apparatus which can separate the masa stream into masa logs.

Another advantage associated with the invention is the automatic distribution of the masa logs to the individual masa hoppers requiring resupply. As discussed above, it is desirable to eliminate the cost of the human labor associated with maintaining the proper level of masa within each masa hopper. The automatic monitoring by the sensors and the corresponding automatic operation of the diverter gates provides for the automatic distribution of masa logs to the masa hoppers. Accordingly, the supply of masa within each masa hopper is advantageously maintained without the costs associated with human labor.

Yet another advantage with the invention is the automatic removal of gas bubbles from the masa within the masa hoppers. As discussed above, it is desirable to eliminate the human labor associated with the removal of the gas bubbles from the masa within the masa hoppers. The projections on the rotating shafts advantageously compress the masa and remove the gas bubbles without any corresponding human labor. Accordingly, the gas bubbles are advantageously removed without the costs associated with such human labor.

In one aspect of the invention, the facing surfaces of the separator conveyors are curved toward each other so that a cradle is formed for securely holding the masa between the separator conveyors. As compared to an arrangement having Bat facing surfaces, the masa is less likely to move out from its position between the separator conveyors.

In another aspect of the invention, each masa hopper has a scraper for each of its primary rollers. Each scraper has a blade which is pivotally mounted and biased to longitudinally ride on the lower surface of its associated primary roller. The blade separates the masa which has adhered to the surface of the primary roller. An advantage associated with this aspect of the invention is the prevention of the masa curtain from becoming stuck to the lower surface of the primary rollers. As discussed above, it is desirable to maintain the movement of the masa curtain toward the sheeter rollers. When the masa curtain adheres to one of the primary rollers, the masa curtain may not continue toward the sheeter rollers. Accordingly, this aspect of the invention advantageously ensures that the masa curtain travels toward the sheeter rollers instead of becoming diverted by adherence to one of the primary rollers.

It will be appreciated that, while the masa handling system of the present invention is especially adapted for use with a corn based masa dough, the invention will also handle any dough that has similar properties. Accordingly, the invention could also be used in conjunction with any other dough which could be handled according to the masa dough handled by the present invention.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In the drawings:

FIG. 5 is a side view of several feed conveyors positioned over two masa hoppers, shown in partial cut-away section.

FIG. 6 is a side view of a diverter gate shown in FIG. 5.

FIG. 6A is an end view of the diverter gate shown in FIG. 6, shown in partial cut-away section.

FIG. 7 is a side view, in partial cut-away section, of a masa hopper shown in FIG. 1.

FIG. 8 is a perspective view of the A/C motor and drive gears for the primary rollers and rotating shafts shown in FIG. 7.

FIG. 9 is a detail perspective view of the rotating shafts shown in FIG. 7.

DETAILED DESCRIPTION OF THE PREFERRED EMBODIMENT

Figure 1:
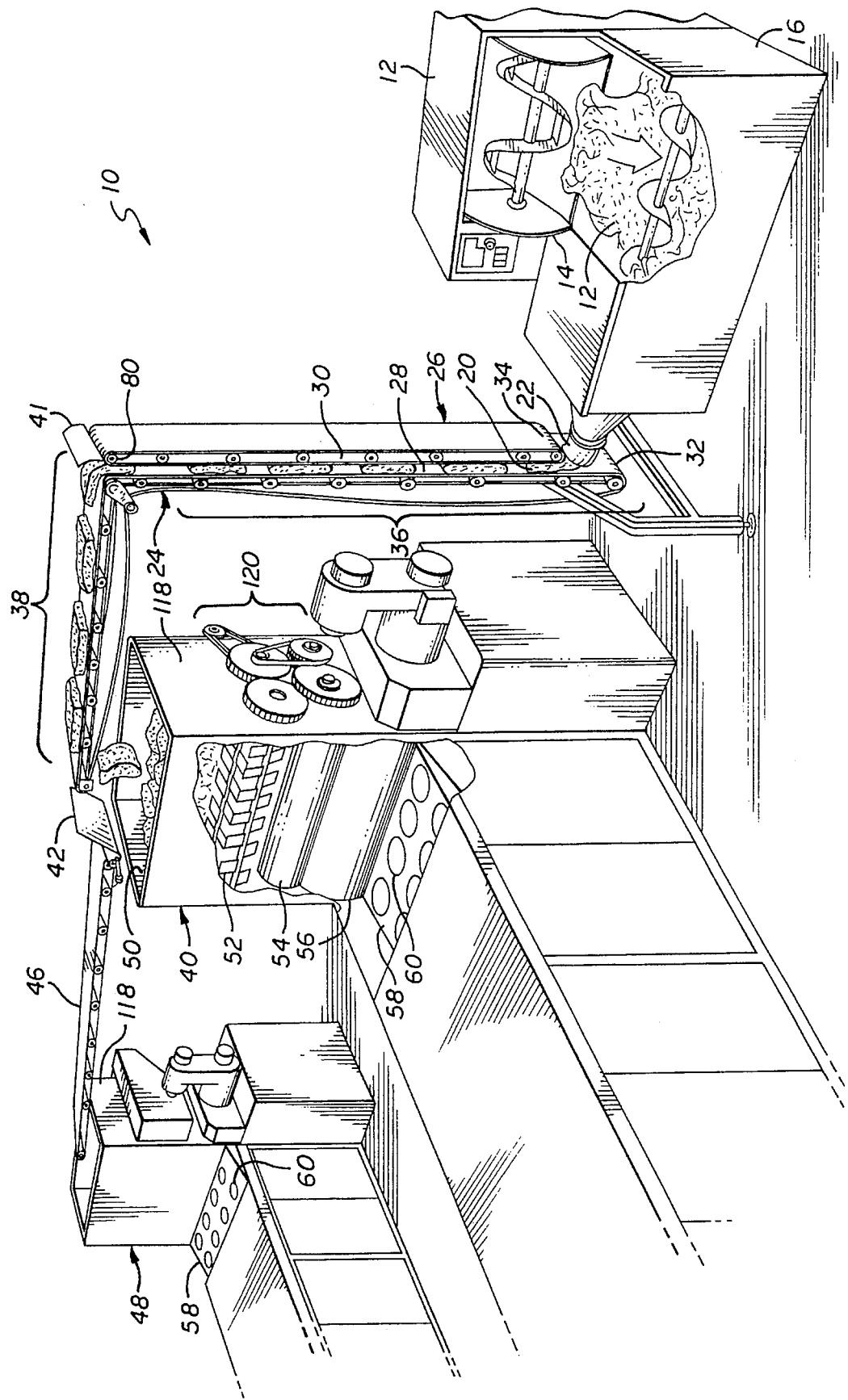
FIG. 1 is a perspective view of a masa handling system, partly in cut away section.

As shown in the exemplary drawings, the present invention is embodied in a masa handling system, generally referred to by the reference numeral 10, for use within a food processing system which produces a food product made from masa. Masa is a dough produced by cooking whole corn and grinding it wet or by combining instant corn masa flour with water in a commonly available mixer. This dough is generally referred to as "masa". However, the term "masa" as used herein refers to this corn dough and other doughs having similar characteristics.

The preferred masa handling system 10 (FIG. 1) is a part of a larger arrangement of apparatus intended for the commercial production of tortillas or other food having a masa dough as an ingredient. The general arrangement of the preferred masa handling system 10 will now be described. A commonly available commercial mixer 12 is located at the beginning of the production line. The mixer 12 has a pivoting door 14 which can rotate downward towards a masa extruder 16. The masa extruder 16 can be of any type, as long as it compresses the masa 18 and feeds a generally continuous masa stream 20 through a nozzle 22. Two vertically opposed and aligned endless belt separator conveyors 24 and 26 have moving surfaces 28 and 30 which face each other. The longitudinal ends 32 and 34 of separator conveyors 24 and 26 are mounted adjacent to the nozzle 22. One of the two separator conveyors 24 is "L" shaped and has a vertical section, or vertical portion, 36 and a horizontal section, or horizontal portion, 38 which terminates above a masa hopper 40. The vertical section 36 of the "L" shaped separator conveyor 24 extends longitudinally below the longitudinal end of the other separator conveyor, thereby providing a moving surface opposite from the nozzle 22. A defector plate 41 is mounted on the end of the other separator conveyor 26. The previously discussed separator conveyors 24 and 26 move the masa 18 to the first masa hopper 40. That masa 18 hopper 40 must be supplied with masa 18 periodically.

A selectively operable diverter gate, for periodically allowing resupply of the masa hopper 40, is located adjacent to the end 44 of the horizontal section 38 of the "L" shaped separator conveyor 24. The diverter gate 42 is shown in its open position. However, when the diverter gate 42 is closed, its top surface 45 forms a gravity slide that feeds to a horizontal feed conveyor 46, which, in turn, feeds another masa hopper 48. It will be understood that while two masa hoppers 40 and 48 are shown, the masa handling system 10 can be adapted for use with any number of masa hoppers. Therefore, the invention is not limited by the number of masa hoppers.

Each masa hopper 40 and 48 has a hollow inner gravity feeder portion 50 containing two counter rotating shafts 52 mounted above a pair of primary rollers 54. The primary rollers 54 are, in turn, mounted above a pair of sheeter rollers 56 and a common rotary cutter (not shown). A horizontal tortilla conveyor 58 is mounted below the rotary cutter and has tortillas 60 on its upper surface 62. The remainder of the system can include various combinations of commonly known and widely available commercial food processing apparatus (not shown), such as an oven, a cooling rack, and a packaging system.

Figures 2, 3, 4:
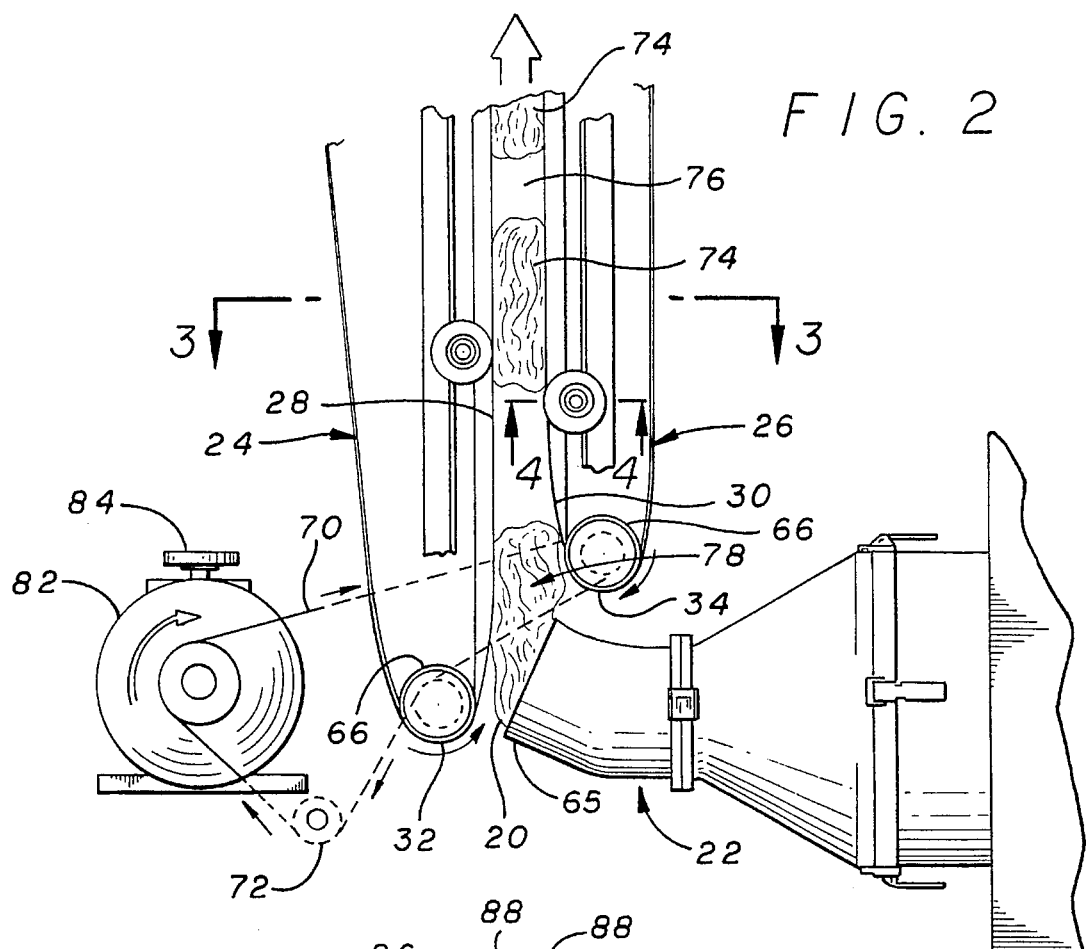
FIG. 2 is a side view showing the separator conveyors accepting masa from the nozzle.
FIG. 3 is a cross-sectional elevational view of the separator conveyors shown in FIG. 2.
FIG. 4 is a cross-sectional elevational view, partially in cut-away section, of the idler rollers shown in FIG. 3.

The masa handling system 10 has a structure intended to separate masa logs 64 from a continuous stream of masa 20 (FIGS. 2, 3, and 4). The masa extruder 16 is connected to a nozzle 22. The nozzle 22 has a generally circular cross section and is angled so that its end 65 is slightly elevated. A generally continuous masa stream 20 is shown exiting from the nozzle 22. The ends of two aligned, opposed, vertical endless belt separator conveyors 24 and 26 are spaced apart and each pass around an associated one of two drive rollers 66 adjacent to the nozzle 22. The drive rollers 66 are connected to a variable speed A/C motor 68 via a belt 70, which also passes around a tensioner wheel 72. The "L" shaped separator conveyor 24 extends longitudinally below the end of the other separator conveyor 26 and has a moving surface 28 facing the nozzle 22. The other separator conveyor 26 also has a moving surface 30. The separator conveyors 24 and 26 are spaced to hold masa pieces, or logs 74, between them. The distance separating the two separator conveyors 24 and 26 will vary with the size of the generally continuous masa stream 20 extruded from the nozzle 22. The space between the moving surfaces 28 and 30 of the separator conveyors 24 and 26 defines a masa chamber 76. The masa chamber 76 extends the vertical length of the separator conveyors 24 and 26 and has an input end 78 adjacent to the nozzle 22 and an output end 80 where the masa logs 74 are deposited onto the horizontal portion section 38 of the "L" shaped conveyor 24. The separator conveyors 24 and 26 must be driven in order to separate the masa logs 74 and move them away from the nozzle 22.

A variable speed A/C motor 82 is provided to drive the separator conveyors 24 and 26. The A/C motor 82 has an upper knob 84 to enable the user to adjust its speed. The required power of the motor 82 varies with the length of the separator conveyors 24 and 26 to be driven, however, an A/C motor 82 between ½ and 3 horsepower is generally adequate for most applications. The method by which the speed of the motor 82 is adjusted is commonly known and can be either by a mechanical means, such as a gearbox (not shown), or an electronic means, such as by an A/C frequency inverter (not shown). While the masa 74 moves upward, the masa 74 must be prevented from falling out from between the separator conveyors 24 and 26.

The moving surfaces 28 and 30 of the separator conveyors 24 and 26 are supported by trapezoidal idler rollers 86 which keep the masa logs 74 between the separator conveyors 24 and 26. The trapezoidal idler rollers 86 cause the moving surfaces 28 and 30 of the separator conveyors 24 and 26 to curve toward each other on their edges 88. Because the edges 88 of the moving surfaces 28 and 30 are curved toward each other, a cradle 90 is formed for securely holding the masa logs 74 between the separator conveyors 24 and 26. Each idler roller 86 is fastened to the frame 92 of the conveyors 24 and 26 by well known means, such as by a threaded axle 94 and a nut 96. After the masa logs 74 have been separated from the masa stream 20, they must be guided into a masa hopper 40 which requires resupply.

The selectively operable diverter gate 46 (FIG. 5) is mounted between an upstream 98 and a downstream 100 endless belt feed conveyor and guides the masa logs 74 to the appropriate masa hopper. The feed conveyors 98 and 100 are positioned end to end, and are vertically spaced so that the masa logs 74 can move from one feed conveyor 98 and 100 to the next, in series. The diverter gate 42 is pivotally mounted on the downstream feed conveyor 100 and, in the closed position, extends to the end of the upstream feed conveyor 98 thereby forming a gravity slide between the two feed conveyors 98 and 100. In the open position, the diverter gate 42 is withdrawn from the upstream feed conveyor 98. While two diverter gates 42 are shown, any number can be used, depending on the number of masa hoppers 40 desired. Generally, every masa hopper 40, except the last in the series, has an associated diverter gate 42 mounted above it. The last masa hopper 40 does not have a diverter gate 42 because a feed conveyor 46 terminates above it. It will be understood, however, that the last masa hopper 40 could have an associated diverter gate 42 should the diversion of masa logs 74 from that masa hopper 40, for recycling or other purposes, be desired. The diverter gate 42 must be driven by a device in order to move between the open and closed positions.

The selectively operable diverter gate 42 (FIGS. 6 and 6A) is driven by a pneumatic cylinder 102 which is controlled by a common programmable language controller 104 (PLC). The PLC 104 is shown as separate boxes in FIG. 5 for clarity purposes. Preferably, only one PLC 104 is needed to drive multiple diverter gates 42, however, each diverter gate 42 could have its own associated PLC 104. The PLC 104 is also connected to a photo sensor 106 positioned to sense the level of masa 74 within the masa hopper 40 and provide the corresponding signal to the PLC 104. The diverter gate 42 is connected to a pneumatic cylinder 102 mounted on the downstream feed conveyor 100. The diverter gate 42 has a generally rectangular section 108 extending across the width of the feed conveyors 98 and 100 and a smaller rectangular arm 110 protruding below the rectangular section 108. The smaller rectangular arm 110 facilitates the attachment of the diverter gate 42 to the pivot point 112 and the pneumatic cylinder 102 mounted on the side of the downstream feed conveyor 100. When the pneumatic cylinder 102 withdraws the diverter gate 42 away from the upstream feed conveyor 98, the masa logs 74 drop off of the upstream feed conveyor 98, accordingly, a structure must be provided to catch the masa logs 74.

A self feeding masa hopper 40 (FIG. 7, 8, and 9) is located beneath the end of the upstream feed conveyor 98 and catches the masa logs 74 after they have been diverted. The self feeding masa hopper 40 has a gravity feeder including side walls 113 and a curving bottom wall 114 which defines a slot 116. A pair of horizontal counter-rotating shafts 52 are mounted within the gravity feeder 50. The shafts 52 are generally parallel to each other and longitudinally straddle the slot 116, which is below the shafts 52 in the bottom wall of the gravity feeder 50. One end of each of the shafts 52 extends through the wall 118 of the masa hopper 40 to interface with drive gears 120 to be described later. The shafts 52 have rectangular projections 122 which are positioned in an alternating fashion so as to enable the projections 122 to intermesh and pass through the same space above the slot 116 as they are rotated. When the projections 122 pass above the slot 116, they drive the masa 74 through the slot 116 so it can be rolled. Accordingly, a structure must be provided to roll the masa 74.

The self feeding masa hopper 40 has a pair of horizontal primary rollers 54 to accept the masa 74 which passes through the slot 116. The primary rollers 54 have a cylindrical surface 124 and are mounted in a generally parallel, horizontally aligned relationship between two endcaps 126. The endcaps 126 prevent the masa 74 from moving horizontally, along the surface 124 of the primary rollers 54, past the ends of the primary rollers 54. The primary rollers 54 are positioned so that a gap 128 is defined between their converging surfaces 124. The gap 128 is below and aligns with the slot 116 to facilitate the travel of the masa 74 from the slot 116 through the primary rollers 54. The width of the gap 128 varies according to the food product to be produced, but is generally ¼ inch for typical tortilla production. It is to be understood that the width of the gap 128 between the primary rollers 54 of the masa hopper 40 can be varied according to the food product. Accordingly, the invention is not to be limited by the gap 128 between the primary rollers 54 of the masa hopper 40. After the masa 74 has passed through the gap 128, the masa 74 often adheres to the surfaces 124 of the primary rollers 54.

Two scrapers 130 are provided to prevent the masa 74 from adhering to the primary rollers 54. Each scraper 130 has a generally rectangular blade 132 which has a sharp point 134 that rides along the lower surface 136 of a primary roller 54 and separates any adhering masa 74. The blade 132 is made from ultra high molecular weight (UHM) copolymer plastic or any common equivalent, such as polytetraflouroethylene. A stainless steel pivoting beam 138 is attached along the base of the blade 132 by screws (not shown) countersunk into the blade 132 material. The pivoting beam 138 has a generally square cross section, but has cylindrical ends 140. A threaded, centered hole 142 is provided on each end of the beam 138 for attachment to the masa hopper 40. Two arms 143 are perpendicularly attached to each beam 138 and extend behind the blade 132. The arms 143 are joined to the beam 138 by welding or any other common joining process. A spring 144 is connected between the end of each arm 143 and the wall 118 of the masa hopper 40, thereby providing a biasing force to keep the blade 132 riding on the lower surface 136 of the primary roller 54. Once the masa 74 has passed by the scrapers 130, it has a thickness to great for forming tortillas 60. Accordingly, the masa 74 must be compressed yet again.

Two sheeter rollers 56 are provided for compressing the masa 74 to the final thickness which is suitable for the final cutting of the tortillas 60. The sheeter rollers 56 are generally cylindrical are mounted in a generally parallel, horizontally aligned relationship. The sheeter rollers 56 are positioned so that a gap 146 is defined between their converging surfaces 147. The gap 146 between the sheeter rollers 56 is below and aligns with the gap 140 between the primary rollers 54 to facilitate the travel of the masa 74 from the primary rollers 54 to the sheeter rollers 56. A rotary cutter (not shown) is mounted below the sheeter rollers 56 so that tortillas 60 are expelled onto the horizontal tortilla conveyor 58. The rotary cutter (not shown) is commonly available and can be adapted to cut any shape from the sheeted masa (not shown). The previously described structure, including the rotary shafts 52 and the primary rollers 54, must be driven in order to properly process the masa.

A masa hopper motor 148 (FIG. 8) drives the rotary shafts 52 and the primary rollers 54 through the drive gears 120 on the outside of the masa hopper. The masa hopper motor 148 operates on A/C current and is capable of variable speeds due to an electronic control, such as an A/C frequency inverter (not shown). A mechanical gear arrangement (not shown) may also be used to yield variable speeds. The power of the masa hopper motor 148 varies according to specific applications, but generally a 2 to 5 horse-power motor is adequate. A belt 150 connects the masa hopper motor 148 and a first gear 152 mounted on the first shaft 52. That same shaft 52 extends into the masa hopper and has the projections which compress the masa. A larger second gear 154 mounted on the same rotary shaft 52 intermeshes with a generally equally sized third gear 156 which is mounted to the other shaft 52. Another fourth gear 158 is connected to the first shaft has a belt connected to a lower, fifth gear 160. The fifth gear 160 is mounted on a primary roller axle 162, which has, in turn another, sixth gear 164, which intermeshes with yet another seventh gear 166 mounted on the other primary roller axle 168. While the sizes of the sixth 164 and seventh gears 166 can be varied, a ratio of 10.333 to 4.25 is generally preferred. After having understood the interrelating structure of the masa handling system 10, the movement of the masa 74 through the system should now be described.

Generally, the preferred masa handling system 10 is intended to move masa 18 from a commonly available masa extruder 16 to the horizontal tortilla conveyor 58 leading to further food processing equipment, such as a commercial oven or fryer. Generally, masa dough 18 is used for the production of tortillas 60 having varying shapes. However, such dough can be used to produce a variety of other food products.

The process begins (FIG. 1) with the initial creation of the masa 18 in the mixer. When the masa 18 is suitably mixed, the pivoting door 14 opens and allows the attending workers to transfer the masa 18 into the extruder 16. The extruder 16 drives the masa 18 through the nozzle 22 so that a generally continuous masa stream 20 is projected up against the vertical surface 28 of the "L" shaped separator conveyor 24, which is moving upwards. The friction between the masa stream 20 and the vertical surface 28 of the "L" shaped conveyor 24 guides the masa stream 20 between the separator conveyors 24 and 26. The masa stream 20 is pulled until it fractures into masa pieces, or masa logs 74. As used herein, the term "masa logs" 74 generally refers to pieces of masa separated from the generally continuous masa stream 20, including those with a generally oval cross section. The masa logs 74 travel upward and are guided onto the horizontal portion 38 of the "L" shaped separator conveyor 24 by the deflector plate 41. The masa logs 74 then travel to the selectively operable diverter gate 42, which can either be automatically opened to allow the masa logs 74 to drop into the masa hopper 40, or automatically closed to guide the masa logs 74 to the next feed conveyor 100, which feeds the other masa hoppers 40. The precise operation of the selectively operable diverter gate 42 will be described below. Once in the masa hopper 40, the masa 74 is compressed by the projections on the rotating shafts 52, thereby removing the gas bubbles (not shown) within the masa 74 and forcing the masa 74 into the primary rollers 54. The primary rollers 54 compress the masa 74 into a generally uniform curtain (not shown) which is fed into the sheeter rollers 56. The sheeter rollers 56 compress the masa curtain to a thickness suitable for the cutting of tortillas 60, which is accomplished by the rotary cutter (not shown). The tortillas 60 then are carried by the tortilla conveyor 58 toward the remainder of the processing system (not shown), which can contain combinations of commonly known and widely available commercial food processing apparatus (not shown), such as an oven, a cooling rack, and a packaging system. The following description will provide more detail on the operation of the elements of the masa handling system 10.

The separation of the generally continuous masa stream 20 into masa logs 74 will now be described (FIGS. 2, 3, and 4). The generally continuous masa stream 20 is forced through the nozzle 22 by the extruder. The masa stream 20 has the cross section of the nozzle 22, which is generally circular. However, it will be understood that nozzles having other cross-sectional shapes could also be used. The generally continuous masa stream 20 moves into contact with the vertical surface 28 of the "L" shaped separator conveyor 24, which is moving upwards. The friction between the vertically moving surface 28 of the "L" shaped separator conveyor 24 and the masa stream 20 causes the masa stream 20 to move upwards into contact with the moving surface 30 of the other separator conveyor 26. The masa stream 20 must next be separated into the individual masa logs 74 required for further processing.

Together, the moving surfaces 28 and 30 of the separator conveyors 24 and 26 act to separate the masa stream 20 into individual masa logs 74. The moving surfaces 28 and 30 of the separator conveyors 24 and 26 are moved by the drive rollers 66 which are, in turn, driven by the variable speed A/C motor 82. The tensioner wheel 72 is biased to provide the proper tension on the belt 70 linking the A/C motor 82 to the drive rollers 66. The speed of the A/C motor 82 is adjusted such that moving surfaces 28 and 30 of the separator conveyors 24 and 26 have an upward speed greater than that at which the masa stream 20 travels from the nozzle 22. The moving surfaces 28 and 30 grip the masa stream 20, so the masa stream 20 is carried upward at the same speed. Accordingly, the masa stream 20 is pulled from the nozzle 22 by the moving surfaces 28 and 30 of the separator conveyors 24 and 26 and is fractured into separate masa pieces, or masa logs 74. In this particular embodiment, the masa logs 74 are compressed between the separator conveyors 24 and 26 such that they have an elongated oval cross section. The general length of the masa logs 74 can be adjusted by changing the speed of the A/C motor 82. As the difference between the speed of the separator conveyors 24 and 26 and the speed at which the masa stream 20 is expelled from the nozzle 22 is increased, the length of the masa logs 74 becomes smaller.

An important advantage is provided by the previously described arrangement and operation of the nozzle 22 and the separator conveyors 24 and 26. Unlike the prior art pneumatic cutter, the masa handling system 10 has no sharp blade which could injure an attending worker. Accordingly, the masa handling system 10 advantageously avoids the dangers associated with a sharp blade, and provides a relatively safer apparatus and method for the separation of a generally continuous masa stream 20 into masa logs 74.

Another advantage associated is associated with the trapezoidal idler rollers 86 which are mounted behind the moving surfaces 28 and 30 of the separator conveyors 24 and 26. The converging edges 88 of the moving surfaces 28 and 30 form a cradle 90 which keeps the masa logs 74 between the separator conveyors 24 and 26. As compared to an arrangement having flat moving surfaces, the masa logs 74 are less likely to fall out from between the separator conveyors 24 and 26. After the masa stream 20 is separated into masa logs 74, the masa logs 74 must be diverted to the horizontal 38, or feed, portion of the "L" shaped separator conveyor 24.

The deflector plate 41 guides the masa logs 74 onto the horizontal portion 38 of the "L" shaped separator conveyor 24. The masa logs 74 then move towards the selectively operable diverter gates 42. The photo-sensor 106 mounted adjacent to each masa hopper 40 senses the level of masa 74 therein. If the level of the masa 74 within any one masa hopper 40 drops below a predetermined level, the sensor 106 associated with that masa hopper 40 changes the state of its signal which is sent to the PLC 104. The PLC 104 then commands the pneumatic cylinder 102 to retract the diverter gate 42 located above that masa hopper 40. That diverter gate 42 pivots into an open position and the masa logs 74 then fall into that masa hopper 40. The photo-sensor 106 then signals the PLC 104 when the level of masa 74 within that masa hopper 40 rises above a certain predetermined level. The PLC 104 then commands the pneumatic cylinder 102 to extend, thereby closing that diverter gate 42 and allowing the masa logs 74 to travel on to the next masa hopper 40.

An advantage associated with the diverter gates 42 is the corresponding labor savings due to their automatic operation. Normally, human attendants would be necessary to ensure that the masa hoppers 40 each had a proper supply of masa 74. By utilizing the photosensors 106, the PLC 104, and the pneumatic cylinders 102, the diverter gates 42 operate automatically and the supply of masa logs 74 within each masa hopper 40 is maintained without costly human labor. It should be understood that, while a PLC 104 is preferably used to control the diverter gates 42, a corresponding logic system having electronic relays could also be used to perform the same control functions as the PLC 104. Once the masa logs 74 have been fed to the appropriate masa hopper 40, they must be compressed to remove gas bubbles which cause voids in the rolled masa (not shown).

The self feeding masa hopper 40 compresses and removes the unwanted gas bubbles from the masa 74. The masa is fed, via gravity, to the rotating shafts 52. The projections 122 on the rotating shafts 52 compress the masa 74 and force it through the slot 116 towards the primary rollers 54. The projections 122 on the rotating shafts 52 advantageously remove gas bubbles by compressing the masa 74 without requiring any human labor. Accordingly, the costs associated with the human attendants required by the prior art masa hoppers are avoided. Once the gas bubbles are removed from the masa 74, the masa must be rolled into a generally uniform curtain (not shown).

The primary rollers 54 compress the masa 74 into the generally uniform curtain suitable for feeding to the sheeter rollers 56. Both primary rollers 54 are driven by the masa hopper A/C motor 148 and have different sized drive gears 120 so the primary rollers 54 rotate at different speeds. This arrangement is especially advantageous because, as compared to rollers driven at the same speed, the masa 74 is less likely to stick to the lower surface of the primary rollers 54 when they rotate at different speeds. If the masa 74 sticks to the lower surface 136 of one of the primary rollers 54, it is carried around and will not be fed into the sheeter rollers 56. Accordingly, it is desirable to prevent the masa 74 from becoming stuck to the lower surface of the primary rollers 54. However, if, despite the differential speed, the masa 74 becomes stuck to one of the lower surfaces 136 of the primary rollers 54, it must be removed.

The scrapers 130 will advantageously separate the masa curtain if it becomes stuck to the lower surface 136 of one of the primary rollers 54. The springs 144 bias the blades 132 so that they ride on the lower surfaces 136 of the primary rollers 54. Accordingly, when the masa curtain becomes stuck to the lower surface 136 of one of the primary rollers 54, the blade 132 scrapes it off and it continues to travel towards the sheeter rollers 56.

The sheeter rollers 56 counter rotate at the same speed and compress the masa into its final thickness. The rotary cutter (not shown) cuts circular tortillas 60 from the masa on the underside of one of the sheeter rollers 56. The tortillas 60 then fall onto the tortilla conveyor 58 and are moved towards other food processing equipment, such as an oven.

It should be appreciated from the foregoing description that the present invention provides a masa handling system 10 having the following features: the safe separation of the masa stream 20 into individual logs 74; the automatic distribution of those logs 74 to the masa hoppers 40 requiring resupply; the automatic removal of gas bubbles from the masa within the masa hoppers; and the prevention of the masa curtain from becoming stuck to the primary rollers 54.

While a particular form of the invention has been illustrated and described, it will be apparent that various modifications can be made without departing from the spirit and scope of the invention. Accordingly, it is not intended that the invention be limited, except as by the appended claims.

We claim:

1. A masa handling system for use in a food processing system for masa, or other similar dough, the food processing system being of the type having a masa producing device, producing a generally continuous stream of masa, to a pair of opposed, aligned, counter rotating sheeter rollers, said masa handling system comprising:

a masa separator having
a pair of aligned, opposed endless belt separator conveyors having their facing surfaces spaced apart and generally parallel to define a masa chamber therebetween having input and output ends;
a nozzle connected to the masa producing device for feeding masa into the input end of said masa chamber to be gripped by said facing surfaces and transported therebetween;
the facing surfaces of said separator conveyors moving in the same direction away from said nozzle to cause the masa to be separated into masa logs;

a masa hopper feed system having
at least two masa hoppers;
at least two endless belt feed conveyors having upper surfaces moving in the same direction and arranged in relative upstream and downstream positions relative to each other;
said upstream feed conveyor extending from said output end of said masa chamber defined by said opposed, aligned separator conveyors of said masa separator, to receive the masa logs, to a point generally above one of said masa hoppers;
said downstream feed conveyor extending from a position spaced from said upstream conveyor to a point generally above another of said masa hoppers;
a movable diverter gate positioned between said feed conveyors for selective movement between
a first position whereby masa logs are guided from said upstream feed conveyor to said downstream feed conveyor, and
a second position whereby the masa logs are guided into said one masa hopper;
a sensor associated with said one masa hopper sensing the level of masa therein and causing a signal which changes its state when the level of masa in said one hopper is below a predetermined level;
a mechanism connected to said diverter gate responsive to said signal to move said diverter gate from said first to said second position when the level of masa in said one masa hopper is sensed to be below the predetermined level and to return said diverter gate to said first position when the level of masa in said one masa hopper is sensed to be above the predetermined level;

said masa hoppers being self feeding, each said masa hopper having
an opening positioned to receive masa from the associated one of said feed conveyors;
a gravity feeder having side walls and a bottom wall cooperating to define a space for the placement of the masa to be fed to the sheeter rollers;
one or more rotating shafts mounted within said gravity feeder, each shaft having projections for removing gas bubbles from the masa and forcing the masa toward the sheeter rollers;
said bottom wall of said gravity feeder extending from the side walls and defining a slot for the masa to pass through towards the sheeter rollers.

2. The masa separating apparatus as defined in claim 1, wherein each of said facing surfaces of said separator conveyors is curved towards said other such that a cradle is formed for securely holding the masa between said separator conveyors.

3. The masa separating apparatus as defined in claim 1, wherein both said facing surfaces of said separator conveyors are driven by a variable speed motor.

4. The masa separating apparatus as defined in claim 1, wherein said end of one said separator conveyor extends longitudinally beyond said end of said other separator conveyor such that the generally continuous masa stream contacts said facing surface of said extended separator conveyor before the said facing surface of said other extended separator conveyor, said extended separator conveyor for guiding the generally continuous masa stream to said facing surface of said other separator conveyor.

5. The masa hopper feed system as defined by claim 1, wherein said mechanism is a pneumatic cylinder connected to a controller.

6. The masa hopper feed system as defined by claim 1, wherein said sensor is a photo sensor.

7. The self feeding masa hopper as defined in claim 1, wherein said rotating shafts are generally horizontal and positioned parallel and opposed to each other, said rotating shafts moving in counter-rotating directions such that a portion of said projections on each said shaft pass through the same space without interference.

8. The self feeding masa hopper as defined in claim 7, wherein said projections are rectangular.

9. The self feeding masa hopper as defined in claim 1, further comprising:
at least one pair of aligned and opposed primary rollers, said primary rollers each having two ends and a generally cylindrical surface between each of the ends, said primary rollers both generally aligned with and mounted beneath said slot, said primary rollers counter rotating for accepting the masa passing through said slot and further compressing the masa into a generally uniform curtain for feeding to the sheeter rollers.

10. The self feeding masa hopper as defined in claim 9, wherein said projections are rectangular.

11. The self feeding masa hopper as defined in claim 9, further comprising:
two endcaps associated with each pair of said primary rollers, each endcap defining two generally circular holes through which are mounted said ends of said primary rollers, each endcap fitting closely around said cylindrical surface of said rollers and preventing the masa from escaping along said surface to said ends of said primary rollers.

12. The self feeding masa hopper as defined in claim 9, further comprising:
a scraper for each of said primary rollers, each said scraper having a blade pivotally mounted and biased to longitudinally ride on the lower surface of its associated said primary roller and to separate masa stuck to its associated said primary roller.

13. The self feeding masa hopper as defined in claim 12, wherein said blade of said scraper is generally rectangular.

14. A masa handling system for use in a food processing system for masa, or other similar dough, the food processing system being of the type having a masa producing device, producing a generally continuous stream of masa, to a pair of opposed, aligned, counter rotating sheeter rollers, said masa handling system comprising:
a masa separator having
a pair of aligned, opposed endless belt separator conveyors having their facing surfaces spaced apart and generally parallel to define a masa chamber therebetween having input and output ends;
a nozzle connected to the masa producing device for feeding masa into the input end of said masa chamber to be gripped by said facing surfaces and transported therebetween;
the facing surfaces of said separator conveyors moving in the same direction away from said nozzle to cause the masa to be separated into masa logs;
a masa hopper feed system having
at least two masa hoppers;
at least two endless belt feed conveyors having upper surfaces moving in the same direction and arranged in relative upstream and downstream positions relative to each other;
said upstream feed conveyor extending from said output end of said masa chamber defined by said opposed, aligned separator conveyors of said masa separator, to receive the masa logs, to a point generally above one of said masa hoppers;
said downstream feed conveyor extending from a position spaced from said upstream conveyor to a point generally above another of said masa hoppers;
a movable diverter gate positioned between said feed conveyors for selective movement between
a first position whereby masa logs are guided from said upstream feed conveyor to said downstream feed conveyor, and
a second position whereby the masa logs are guided into said masa hopper;
a sensor associated with each said one masa hopper sensing the level of masa therein and causing a signal which changes its state when the level of masa in said one hopper is below a predetermined level;
a mechanism connected to said diverter gate responsive to said signal to move said diverter gate from said first to said second position when the level of masa in said one masa hopper is sensed to be below the predetermined level and to return said diverter gate to said first position when the level of masa in said one masa hopper is sensed to be above the predetermined level.

15. The masa separating apparatus as defined in claim 14, wherein each of said facing surfaces of said separator conveyors is curved towards said other such that a cradle is formed for securely holding the masa between said separator conveyors.

16. The masa separating apparatus as defined in claim 14, wherein both said facing surfaces of said separator conveyors are driven by a variable speed motor.

17. The masa separating apparatus as defined in claim 14, wherein said end of one said separator conveyor extends longitudinally beyond said end of said other separator conveyor such that the generally continuous masa stream contacts said facing surface of said extended separator conveyor before the said facing surface of said other extended separator conveyor, said extended separator conveyor for guiding the generally continuous masa stream to said facing surface of said other separator conveyor.

18. The masa hopper feed system as defined by claim 14, wherein said mechanism is a pneumatic cylinder connected to a controller.

19. The masa hopper feed system as defined by claim 14, wherein said sensor is a photo sensor.

20. A masa hopper feed system for use in a food processing system for masa, the food processing system being of the type including a masa producing device, such as an extruder, the masa hopper feed system comprising:
at least two masa hoppers, each requiring a periodic re-supply of masa;

at least two endless belt feed conveyors having upper surfaces moving in the same direction and arranged in relative upstream and downstream positions relative to each other;

said upstream feed conveyor extending from the masa producing device to a point generally above one of said masa hoppers;

said downstream feed conveyor extending from a position spaced from said upstream conveyor to a point generally above another of said masa hoppers;

a movable diverter gate positioned between said feed conveyors for selective movement between
a first position in which the diverter gate receives the masa from said upstream feed conveyor and guides it to said downstream feed conveyor, and
a second position in which the masa from said upstream feed conveyor is guided into said masa hopper;

a sensor associated with each said one masa hopper sensing the level of masa therein and causing a signal which changes its state when the level of masa within said one masa hopper is below a predetermined level;

a mechanism connected to said diverter gate responsive to said signal to move said diverter gate from said first to said second position when the level of masa in said one masa hopper is sensed to be below the predetermined level and to return said diverter gate to said first position when the level of masa in said one masa hopper is sensed to be above the predetermined level.

21. The masa hopper feed system as defined by claim 20, wherein said mechanism is a pneumatic cylinder connected to a programmable language controller.

22. The masa hopper feed system as defined by claim 20, wherein said sensor is a photo sensor.

23. A self-feeding masa hopper for use in a food processing system for masa, the food processing system being of the type having a pair of opposed, generally parallel sheeter rollers for the processing of masa, each sheeter roller being driven and rotating about its longitudinal axis such that the masa is drawn between the sheeter rollers, the sheeter rollers compressing the masa to a thickness suitable for cutting or further processing, the self-feeding masa hopper comprising, an opening positioned to receive masa;

a gravity feeder having side walls and a bottom wall, said gravity feeder defining a space for the placement of the masa to be fed to the sheeter rollers;

one or more rotating shafts mounted within said gravity feeder, each said shaft having projections for removing gas bubbles from the masa and forcing the masa towards the sheeter rollers; and said bottom wall of said gravity feeder extending from the side walls and defining a slot for the masa to pass through toward the sheeter rollers.

24. The self feeding masa hopper as defined in claim 23, wherein said rotating shafts are generally horizontal and positions parallel and opposed to each other, said rotating shafts moving in counter-rotating directions such that a portion of said projections on each said shaft pass through the same space without interference.

25. The self feeding masa hopper as defined in claim 24, wherein said projections are rectangular.

26. The self feeding masa hopper as defined in claim 23, further comprising, at least one pair of aligned and opposed primary rollers, said primary rollers each having two ends and a generally cylindrical surface between each of the ends, said primary rollers both generally aligned with and mounted beneath said slot, said primary rollers counter rotating for accepting the masa passing through said slot and further compressing the masa into a generally uniform curtain for feeding to the sheeter rollers.

27. The self feeding masa hopper as defined in claim 26, wherein said rotating shafts are generally horizontal and positions parallel and opposed to each other, said rotating shafts moving in counter-rotating directions such that a portion of said projections on each said shaft pass through the same space without interference.

28. The self feeding masa hopper as defined in claim 26, wherein said projections are rectangular.

29. The self feeding masa hopper as defined in claim 26, further comprising, two endcaps associated with each pair of said primary rollers, each endcap defining two generally circular holes through which are mounted said ends of said primary rollers, each endcap fitting closely around said cylindrical surface of said rollers and preventing the masa from escaping along said surface to said ends of said primary rollers.

30. The self feeding masa hopper as defined in claim 23, further comprising, a scraper for each of said primary rollers, each said scraper having a blade pivotally mounted and biased to longitudinally ride on the lower surface of its associated said primary roller and to separate masa stuck to its associated said primary roller.

31. The self feeding masa hopper as defined in claim 30, wherein said blade of said scraper is generally rectangular.

* * * * *